United States Patent
Kim et al.

(10) Patent No.: US 11,449,720 B2
(45) Date of Patent: Sep. 20, 2022

(54) IMAGE RECOGNITION DEVICE, OPERATING METHOD OF IMAGE RECOGNITION DEVICE, AND COMPUTING DEVICE INCLUDING IMAGE RECOGNITION DEVICE

(71) Applicant: ELECTRONICS AND TELECOMMUNICATIONS RESEARCH INSTITUTE, Daejeon (KR)

(72) Inventors: Ju-Yeob Kim, Daejeon (KR); Byung Jo Kim, Sejong (KR); Seong Min Kim, Sejong (KR); Jin Kyu Kim, Sejong (KR); Ki Hyuk Park, Daejeon (KR); Mi Young Lee, Daejeon (KR); Joo Hyun Lee, Daejeon (KR); Young-deuk Jeon, Sejong (KR); Min-Hyung Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 211 days.

(21) Appl. No.: 16/870,412

(22) Filed: May 8, 2020

(65) Prior Publication Data
US 2020/0356804 A1 Nov. 12, 2020

(30) Foreign Application Priority Data
May 10, 2019 (KR) .......................... 10-2019-0054994

(51) Int. Cl.
*G06K 9/62* (2022.01)

(52) U.S. Cl.
CPC ........... *G06K 9/628* (2013.01); *G06K 9/6215* (2013.01); *G06K 9/6262* (2013.01)

(58) Field of Classification Search
CPC ...... G06V 20/41; G06K 9/628; G06K 9/6292; G06K 9/6262
See application file for complete search history.

(56) References Cited

U.S. PATENT DOCUMENTS

| | | | |
|---|---|---|---|
| 5,799,276 A * | 8/1998 | Komissarchik | ......... G10L 15/18 704/E15.005 |
| 9,524,450 B2 | 12/2016 | Ravindran et al. | |
| 10,157,309 B2 | 12/2018 | Molchanov et al. | |

(Continued)

FOREIGN PATENT DOCUMENTS

KR 20180070103 A 6/2018

*Primary Examiner* — Sam Bhattacharya

(57) ABSTRACT

Provided is an image recognition device. The image recognition device includes a frame data change detector that sequentially receives a plurality of frame data and detects a difference between two consecutive frame data, an ensemble section controller that sets an ensemble section in the plurality of frame data, based on the detected difference, an image recognizer that sequentially identifies classes respectively corresponding to a plurality of section frame data by applying different neural network classifiers to the plurality of section frame data in the ensemble section, and a recognition result classifier that sequentially identifies ensemble classes respectively corresponding to the plurality of section frame data by combining the classes in the ensemble section.

20 Claims, 10 Drawing Sheets

(56) References Cited

U.S. PATENT DOCUMENTS

| | | | |
|---|---|---|---|
| 2007/0110158 A1* | 5/2007 | Maeda | H04N 19/172 |
| | | | 375/E7.262 |
| 2010/0287125 A1* | 11/2010 | Okubo | G06N 20/10 |
| | | | 706/12 |
| 2012/0069183 A1* | 3/2012 | Aoki | G06V 20/52 |
| | | | 348/148 |
| 2012/0124037 A1 | 5/2012 | Lee et al. | |
| 2014/0181668 A1* | 6/2014 | Kritt | H04N 21/47217 |
| | | | 715/719 |
| 2014/0269461 A1* | 9/2014 | Mehta | H04W 76/15 |
| | | | 370/297 |
| 2018/0121601 A1* | 5/2018 | Hahm | G16B 50/40 |
| 2018/0174044 A1 | 6/2018 | Na | |
| 2018/0189596 A1 | 7/2018 | Lee et al. | |
| 2018/0205919 A1* | 7/2018 | Nakagawa | G03B 21/206 |
| 2018/0365532 A1* | 12/2018 | Molchanov | G06N 3/084 |
| 2019/0354388 A1* | 11/2019 | Mitra | G06F 9/547 |
| 2022/0030230 A1* | 1/2022 | Chadwick | G06K 9/6271 |

\* cited by examiner

IMAGE RECOGNITION DEVICE, OPERATING METHOD OF IMAGE RECOGNITION DEVICE, AND COMPUTING DEVICE INCLUDING IMAGE RECOGNITION DEVICE

CROSS-REFERENCE TO RELATED APPLICATIONS

This U.S. non-provisional patent application claims priority under 35 U.S.C. § 119 of Korean Patent Application No. 10-2019-0054994, filed on May 10, 2019, the entire contents of which are hereby incorporated by reference.

BACKGROUND

Embodiments of the inventive concept relate to an image recognition device, and more particularly, relate to an image recognition device that increases an accuracy of image recognition while reducing resources required for image recognition, an operating method of the image recognition device, and a computing device including the image recognition device.

An image recognition device may be used to recognize objects from an image frame. For example, the image recognition device may identify various classes such as people, animals, objects, etc. from image data. The image recognition device may perform an image recognition using an image recognition algorithm learned by machine learning.

Depending on how the image recognition device is learned, an accuracy of the image recognition device may vary. For example, image recognition devices may be learned differently by different machine learning algorithms, such as convolutional neural networks (CNNs), recurrent neural networks (RNNs), etc.

In addition, the image recognition devices may be learned differently by using the same machine learning algorithm, but by varying the number of nodes in an input layer, that is, by varying the number of input parameters. Alternatively, by varying the number of nodes in a hidden layer, the image recognition devices may be learned differently. As another example, by differentiating learning data used for machine learning, the image recognition devices may be learned differently.

The image recognition devices learned differently may have advantages in recognizing different objects. For example, an image recognition device learned based on a first method may recognize persons with higher accuracy than other image recognition devices. An image recognition device learned based on a second method may recognize animals with higher accuracy than other image recognition devices.

SUMMARY

Embodiments according to the inventive concept provide an image recognition device that combines characteristics of differently learned neural network classifiers to increase an accuracy of image recognition while reducing or maintaining resources required for image recognition, an operating method of the image recognition device, and a computing device including the image recognition device.

An image recognition device according to an embodiment of the inventive concept includes a frame data change detector that sequentially receives a plurality of frame data and detects a difference between two consecutive frame data, an ensemble section controller that sets an ensemble section in the plurality of frame data, based on the detected difference, an image recognizer that sequentially identifies classes respectively corresponding to a plurality of section frame data by applying different neural network classifiers to the plurality of section frame data in the ensemble section, and a recognition result classifier that sequentially identifies ensemble classes respectively corresponding to the plurality of section frame data by combining the classes in the ensemble section.

According to an embodiment, when the difference between the two consecutive frame data is more than a threshold, the two consecutive frame data may be incorporated into different ensemble sections by the ensemble section controller. The ensemble section controller may set preceding frame data of the two consecutive frame data as last frame data of a current ensemble section and may set subsequent frame data of the two consecutive frame data as start frame data of a subsequent ensemble section. When the difference between the two consecutive frame data is less than a threshold, the ensemble section controller may include the two consecutive frame data in a current ensemble section.

According to an embodiment, the image recognizer may include neural network classifiers learned in different ways and may sequentially apply the neural network classifiers to the plurality of section frame data in the ensemble section. The neural network classifiers may share operation resources of the image recognizer and may be activated alternately. The recognition result classifier may alternately receive the classes from the neural network classifiers.

According to an embodiment, when a specific class is repeatedly detected from first frame data to nth frame data (where n is a positive integer greater than 1) among the plurality of section frame data, the recognition result classifier may sum probabilities of the specific class detected from the first frame data to the nth frame data, may divide the summed result by n, and may include the divided result in an ensemble class of the nth frame data.

According to an embodiment, when a specific class is detected from nth frame data (where n is a positive integer greater than 2) among the plurality of section frame data, and when the specific class is detected k times (where k is a positive integer greater than 1 and less than n) from first frame data to the nth frame data, the recognition result classifier may sum probabilities of the specific class detected from the first frame data to the nth frame data, may divide the summed result by k, and may include the divided result in an ensemble class of the nth frame data.

According to an embodiment, when a specific class is detected from nth frame data (where n is a positive integer greater than 1) among the plurality of section frame data, and when the specific class is first detected from first frame data to the nth frame data, the recognition result classifier may include the specific class in an ensemble class of the nth frame data.

According to an embodiment, when a specific class is detected from first frame data among the plurality of section frame data, the recognition result classifier may include the specific class in an ensemble class of the first frame data. The ensemble section controller may be configured to further receive the classes, and the ensemble section controller may correct the ensemble section, based on the received classes. When a difference between the classes corresponding to a plurality of consecutive frame data in the ensemble section is more than a threshold, the ensemble section controller may incorporate the plurality of consecutive frame data into different ensemble sections.

A method of operating an image recognition device according to an embodiment of the inventive concept includes receiving frame data, setting an ensemble section, based on a change of between previous frame data and the received frame data, identifying a class in the received frame data by using a neural network classifier different from a neural network classifier applied to the previous frame data in the ensemble section, and identifying an ensemble class by combining a preceding class identified in the previous frame data in the ensemble section and the class identified in the received frame data.

According to an embodiment, the identifying of the ensemble class by combining the preceding class identified in the previous frame data and the class identified in the received frame data in the ensemble section may include combining preceding classes identified in all of a plurality of previous frame data in the ensemble section and the class identified in the received frame data.

According to an embodiment, the setting of the ensemble section, based on the change of between the previous frame data and the received frame data may include when the change of between the previous frame data and the received frame data is less than a threshold, incorporating the received frame data into the same ensemble section as the previous frame data. The method may further include correcting the ensemble section by using the class identified in the received frame data.

A computing device according to an embodiment of the inventive concept includes a processor, a memory that stores a plurality of frame data, and an image recognition device that performs an image recognition of the plurality of frame data stored in the memory, based on a request of the processor. The image recognition device is configured to set an ensemble section, based on a change of the plurality of frame data, to identify classes by applying different neural network classifiers to a plurality of section frame data in the ensemble section, and to identify an ensemble class of a specific time by combining a class of frame data of the specific time and classes of a plurality of previous frame data in the ensemble section.

According to an embodiment, the image recognition device may compare the class of the specific time and the classes of the plurality of previous frame data in the ensemble section and may correct the ensemble section depending on the compared result. When the number of the plurality of frame data included in the ensemble section reaches a threshold, the image recognition device may end the ensemble section and may start a new ensemble section from a subsequent frame data.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Hereinafter, embodiments of the inventive concept will be described clearly and in detail such that those skilled in the art may easily carry out the inventive concept.

Figure 1:
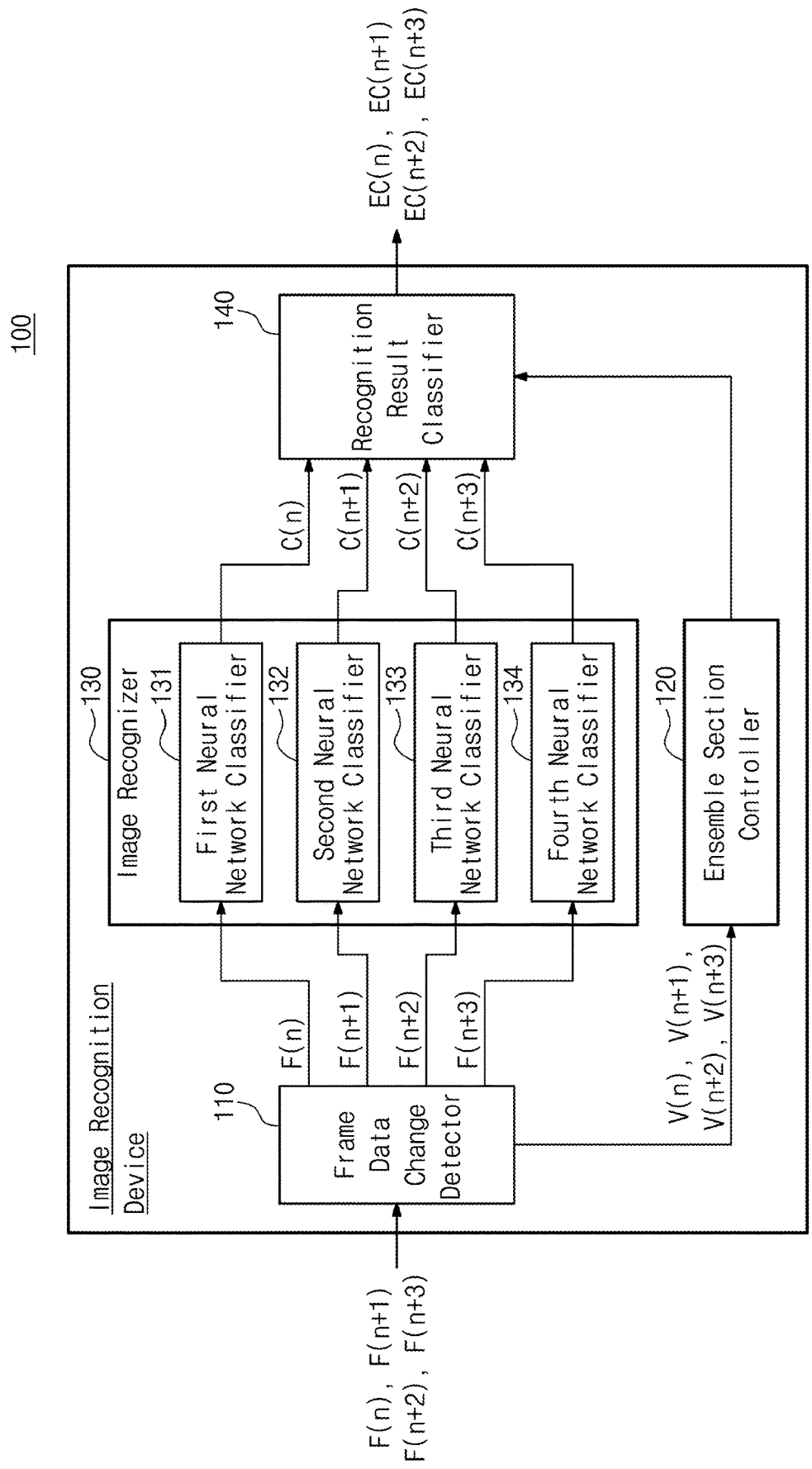
FIG. 1 is a block diagram illustrating an image recognition device according to an embodiment of the inventive concept.

FIG. 1 is a block diagram illustrating an image recognition device 100 according to an embodiment of the inventive concept. Referring to FIG. 1, the image recognition device 100 includes a frame data change detector 110, an ensemble section controller 120, an image recognizer 130, and a recognition result classifier 140.

The frame data change detector 110 may sequentially receive a plurality of frame data from an external device. Exemplarily, the frame data change detector 110 is illustrated to receive nth to n+3th frame data F(n) to F(n+3) (where n is a positive integer), but the inventive concept is not limited thereto.

The frame data change detector 110 may detect a change in the plurality of frame data from the received the nth to n+3th frame data F(n) to F(n+3). For example, the frame data change detector 110 may detect the change of data in two consecutive frame data.

For example, when the nth frame data F(n) (e.g., n=1) is frame data that is first received, the frame data change detector 110 may transmit an nth change V(n) indicating that entire frame data is changed to the ensemble section controller 120.

When n+1th frame data F(n+1) is received, the frame data change detector 110 may detect a change V(n+1) (e.g., a difference) between the nth frame data F(n), which is previous frame data, and the n+1th frame data F(n+1), which is currently received frame data. The frame data change detector 110 may transmit the detected n+1th change V(n+1) to the ensemble section controller 120.

As in the above description, when the n+2th frame data F(n+2) is received, the frame data change detector 110 may transmit an n+2th change V(n+2) between the n+1th frame data F(n+1) and the n+2th frame data F(n+2) to the ensemble section controller 120. When the n+3th frame data F(n+3) is received, the frame data change detector 110 may transmit an n+3th change V(n+3) between the n+2th frame data F(n+2) and the n+3th frame data F(n+3) to the ensemble section controller 120.

The frame data change detector 110 may transmit the nth frame data F(n) to the n+3th frame data F(n+3) to the image recognizer 130. For example, the frame data change detector 110 may alternately transmit the nth to n+3th frame data F(n) to F(n+3) to different neural network classifiers (e.g., first to fourth neural network classifiers 131 to 134) of the image recognizer 130.

The ensemble section controller 120 may receive the nth to n+3 changes V(n) to V(n+3) from the frame data change detector 110. The ensemble section controller 120 may set an ensemble section, based on the received nth to n+3 changes V(n) to V(n+3). For example, the ensemble section controller 120 may determine a start of the ensemble section and an end of the ensemble section, and may transmit the determined result to the recognition result classifier 140.

For example, when the change (e.g., one of the nth to n+3 changes V(n) to V(n+3)) received from the frame data change detector 110 is greater than or equal to a first threshold, the ensemble section controller 120 may determine frame data corresponding to the change as the start of a new ensemble section. Also, the ensemble section controller 120 may determine previous frame data as the end of previous ensemble section.

The image recognizer 130 may include two or more neural network classifiers. For example, the image recognizer 130 is illustrated as including the first to fourth neural network classifiers 131 to 134, but the number of neural network classifiers included in the image recognizer 130 is not limited thereto.

The first to fourth neural network classifiers 131 to 134 of the image recognizer 130 may include neural network classification algorithms that are learned in different ways. For example, the first to fourth neural network classifiers 131 to 134 may be learned differently by different machine learning algorithms such as a convolutional neural network (CNN), a recurrent neural network (RNN), etc.

As another example, the first to fourth neural network classifiers 131 to 134 may be learned differently by using the same machine learning algorithm, but by varying the number of nodes in an input layer, that is, by varying the number of input parameters. As another example, the first to fourth neural network classifiers 131 to 134 may be learned differently by varying the number of nodes in a hidden layer. As another example, the first to fourth neural network classifiers 131 to 134 may be learned differently by using different learning data for machine learning.

The first to fourth neural network classifiers 131 to 134 may share the same operation resource. For example, the first to fourth neural network classifiers 131 to 134 may be alternately activated to share the operation resource to perform a neural network classification. The first to fourth neural network classifiers 131 to 134 may receive the plurality of frame data at different time from the frame data change detector 110.

For example, the first neural network classifier 131 may receive the nth frame data F(n) at a nth time, and may identify nth classes C(n) in the nth frame data F(n). The second neural network classifier 132 may receive the n+1th frame data F(n+1) at a n+1th time, and may identify n+1th classes C(n+1) in the n+1th frame data F(n+1).

As in the above description, the third neural network classifier 133 may receive the n+2th frame data F(n+2) at a n+2th time, and may identify n+2th classes C(n+2) in the n+2th frame data F(n+2). The fourth neural network classifier 134 may receive the n+3th frame data F(n+3) at a n+3th time, and may identify n+3th classes C(n+3) in the n+3th frame data F(n+3).

Afterwards, the first to fourth neural network classifiers 131 to 134 may be sequentially activated again. For example, the first to fourth neural network classifiers 131 to 134 may receive the plurality of frame data at a n+4th time to a n+7th time, respectively, and may respectively identify the classes from the plurality of frame data that are received.

The recognition result classifier 140 may sequentially receive the nth classes C(n) to the n+3th classes C(n+3) from the first to fourth neural network classifiers 131 to 134 of the image recognizer 130. The recognition result classifier 140 may recognize the ensemble section under control of the ensemble section controller 120.

The recognition result classifier 140 may generate nth to n+3th ensemble classes EC(n) to EC(n+3) by combining the classes belonging to the same ensemble section. For example, at a specific time, for example at the n+1th time, the recognition result classifier 140 may generate the n+1th ensemble class EC(n+1) by combining classes identified in the plurality of frame data that precedes the n+1th frame data F(n+1) and belongs to the same ensemble section as the n+1th frame data F(n+1) and the n+1th class C(n+1) identified in the n+1th frame data F(n+1).

That is, in the ensemble section in which the change in frame data is less than the first threshold, the plurality of frame data may be considered to be the same one frame. By applying the different neural network classifiers to the plurality of frame data, an effect of applying the different neural network algorithms to the same frame may occur. Since the different neural network classifiers share the same operation resource, the accuracy of image recognition may be improved while reducing or maintaining the operation resource.

In FIG. 1, the frame data change detector 110 is illustrated as transmitting the plurality of frame data to the first to fourth neural network classifiers 131 to 134 through different paths. However, the frame data change detector 110 may transmit the plurality of frame data to the image recognizer 130 through the same path. The image recognizer 130 may multiplex the plurality of frame data transmitted from the frame data change detector 110 and may sequentially distribute the multiplexed plurality of frame data to the first to fourth neural network classifiers 131 to 134.

In FIG. 1, the first to fourth neural network classifiers 131 to 134 are illustrated as transmitting the classes through different paths to the recognition result classifier 140. However, the image recognizer 130 may demultiplex the classes output from the first to fourth neural network classifiers 131 to 134 and may sequentially transmit the demultiplexed classes to the recognition result classifier 140 through the same path.

Figure 2:
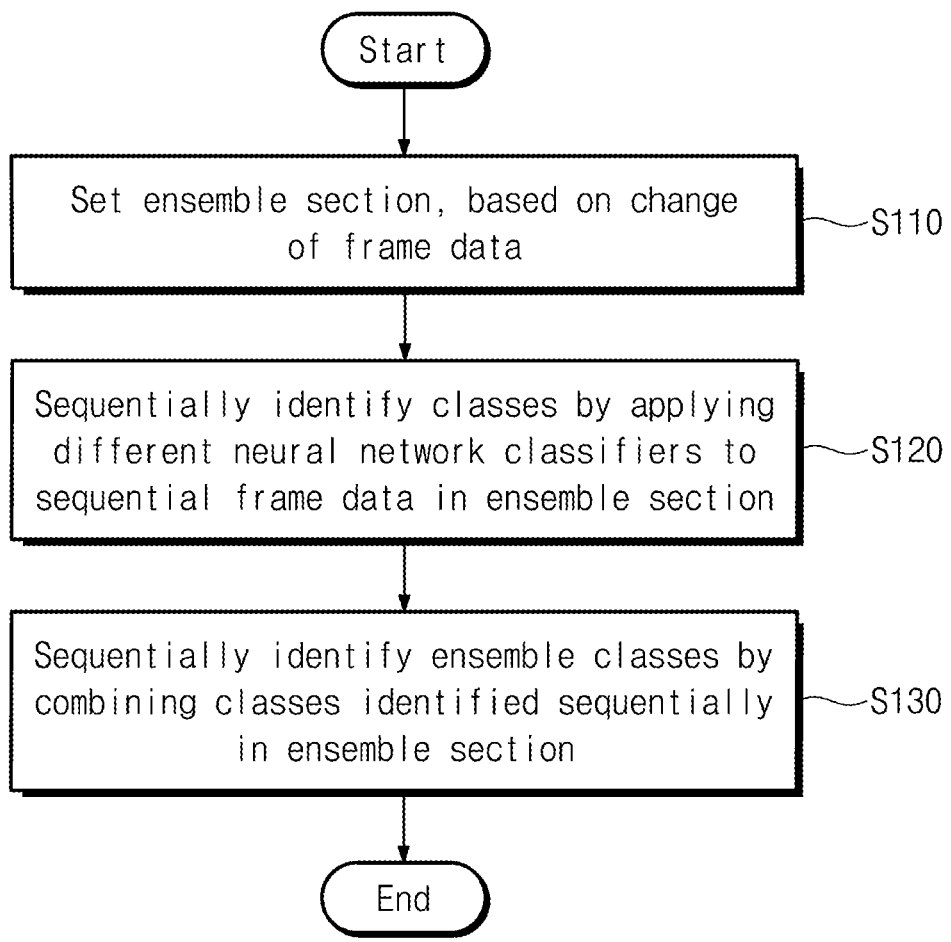
FIG. 2 is a flowchart describing an operating method of an image recognition device according to an embodiment of the inventive concept.

FIG. 2 is a flowchart describing an operating method of the image recognition device 100 according to an embodiment of the inventive concept. Referring to FIGS. 1 and 2, in operation S110, the ensemble section controller 120 of the image recognition device 100 may set the ensemble section, based on the change of the plurality of frame data.

In operation S120, the image recognizer 130 of the image recognition device 100 may sequentially identify the classes by applying the different neural network classifiers to the plurality of frame data that are sequentially received in the ensemble section. In operation S130, the recognition result classifier 140 of the image recognition device 100 may sequentially identify the ensemble classes by combining the classes that are sequentially identified in the ensemble section.

Figure 3:
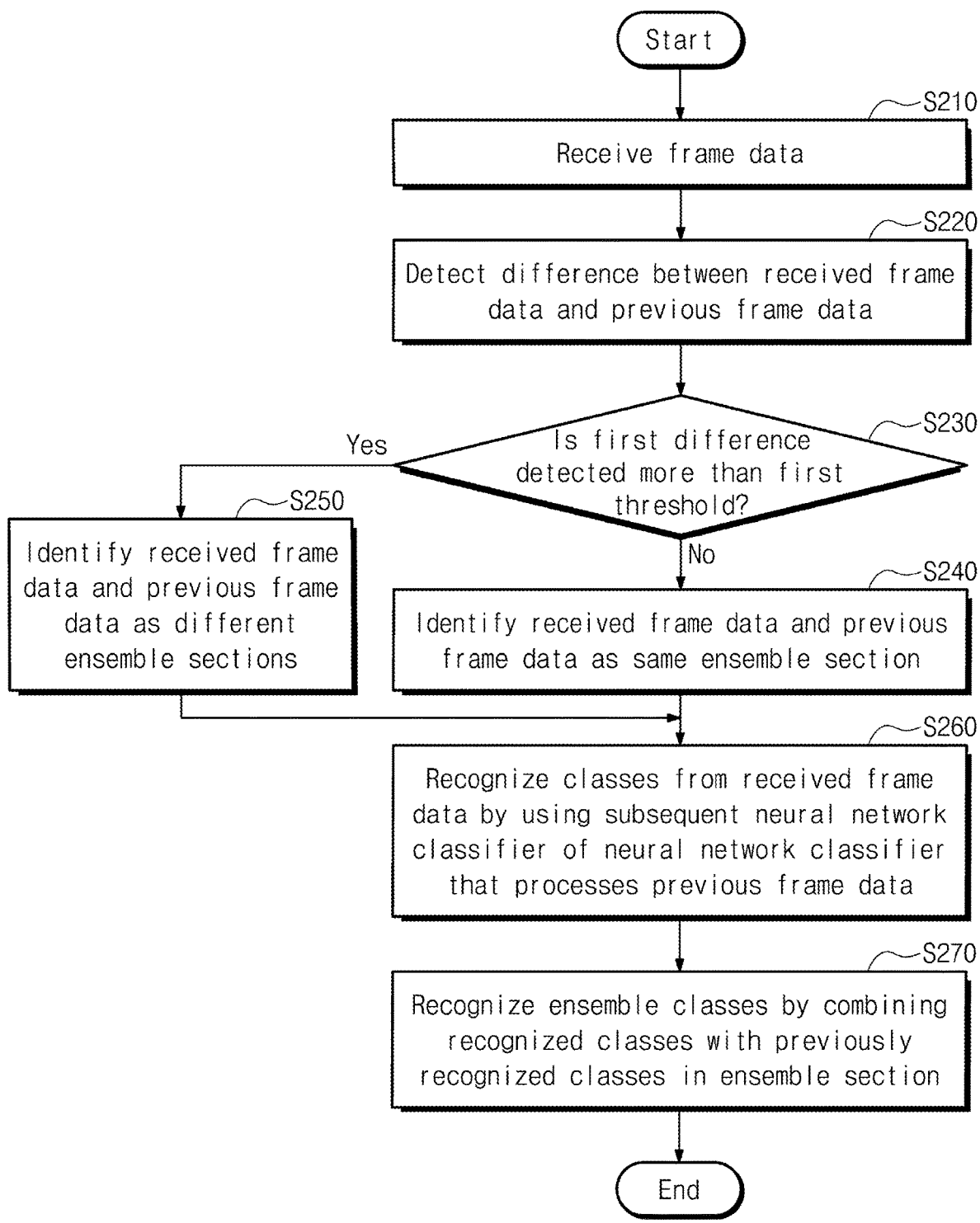
FIG. 3 is a flowchart describing how an image recognition device recognizes an image from a plurality of frame data.

FIG. 3 is a flowchart describing how the image recognition device 100 recognizes an image from a plurality of frame data. Referring to FIGS. 1 and 3, in operation S210, the frame data change detector 110 of the image recognition device 100 may receive the frame data. In operation S220, the frame data change detector 110 may detect the difference (e.g., change) between the received frame data and the previous frame data. The detected difference is transmitted to the ensemble section controller 120.

In operation S230, the ensemble section controller 120 of the image recognition device 100 may determine whether the detected difference is greater than or equal to the first threshold. When the detected difference is less than the first threshold, in operation S240, the ensemble section controller 120 may identify the received frame data and the previous frame data as the same ensemble section. For example, the ensemble section controller 120 may incorporate the received frame data into the ensemble section of the previous frame data. Thereafter, operation S260 is performed.

When the detected difference is more than the first threshold, in operation S250, the ensemble section controller 120 may identify the received frame data and the previous frame data as different ensemble sections. For example, the ensemble section controller 120 may set the previous frame data as the end of the ensemble section. The ensemble section controller 120 may set the received frame data as the start of a new ensemble section. Thereafter, operation S260 is performed.

In operation S260, the image recognizer 130 may recognize the classes from the received frame data by using the subsequent neural network classifier of a neural network classifier that processes the previous frame data. In operation S270, the recognition result classifier 140 may recognize the ensemble classes by combining the recognized classes with previously recognized classes in the ensemble section.

Exemplarily, the ensemble section controller 120 may limit the number of the plurality of frame data included in one ensemble section. For example, when the number of the plurality of frame data incorporated in one ensemble section reaches a specific value (e.g., threshold value), the ensemble section controller 120 may set the received frame data as the end of the ensemble section, regardless of the difference in the plurality of frame data.

In addition, when subsequent frame data is received, the ensemble section controller 120 may set the start of a new ensemble section. Accordingly, since storage space for storing classes of the plurality of frame data is limited, the resource required for the image recognition may be decreased.

Figure 4:
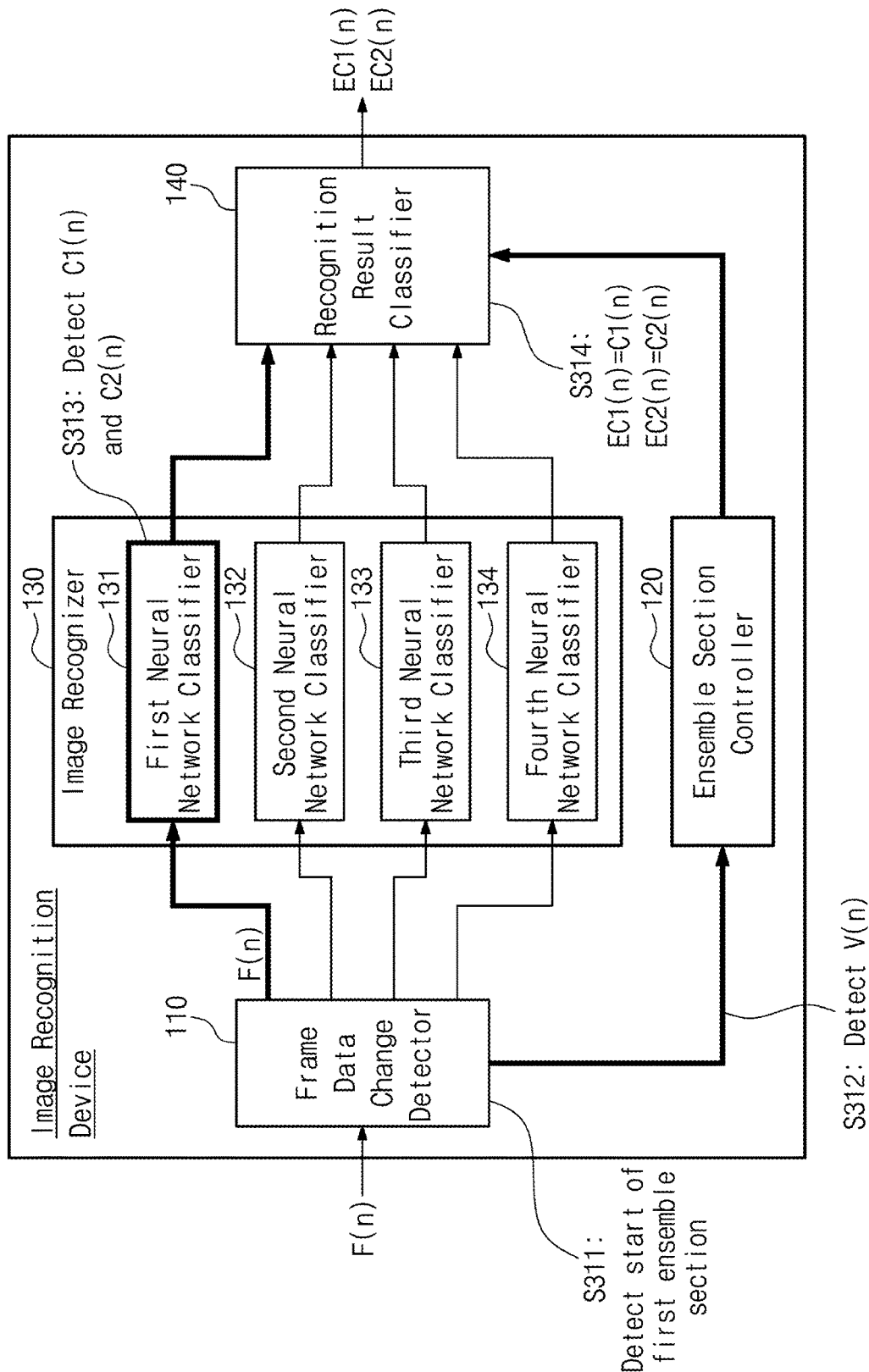
FIG. 4 is a diagram illustrating how an image recognition device recognizes an image from nth frame data.

FIG. 4 is a diagram illustrating how the image recognition device 100 recognizes an image from nth frame data F(n). For example, it is assumed that the nth frame data F(n) is the first frame data received in the image recognition device 100. Referring to FIG. 4, in operation S311, the frame data change detector 110 may receive the nth frame data F(n).

In operation S312, the frame data change detector 110 may detect the nth change V(n) between the nth frame data F(n) and the previous frame data. When the nth frame data F(n) is the first received frame data, there is no the previous frame data. Accordingly, the nth change V(n) indicates that the entire nth frame data F(n) is changed, and may be equal to or greater than the first threshold. The ensemble section controller 120 may set the nth frame data F(n) as the start of a new ensemble section.

In operation S313, the nth frame data F(n) may be transferred to the first neural network classifier 131. The first neural network classifier 131 may identify the first class $C1(n)$ and the second class $C2(n)$ from the nth frame data F(n). The first class $C1(n)$ and the second class $C2(n)$ are transferred to the recognition result classifier 140.

In operation S314, since the previous classes are not exist, the recognition result classifier 140 may output the first class $C1(n)$ as a first ensemble class $EC1(n)$, and may output the second class $C2(n)$ as a second ensemble class $EC2(n)$.

Figure 5:
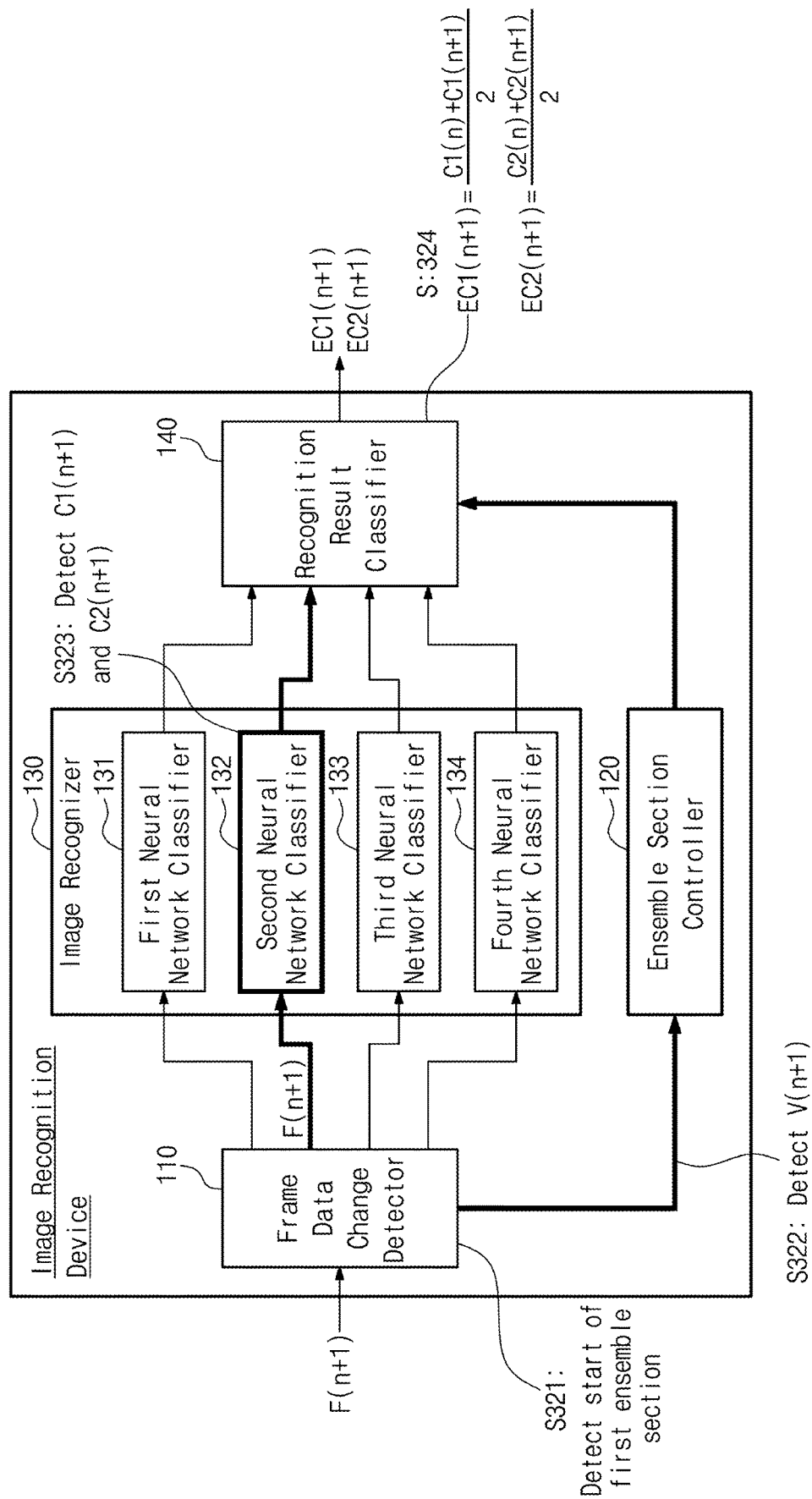
FIG. 5 is a diagram illustrating how an image recognition device recognizes an image from n+1th frame data.

FIG. 5 is a diagram illustrating how the image recognition device 100 recognizes an image from the n+1th frame data F(n+1). Referring to FIG. 5, in operation S321, the frame data change detector 110 may receive the n+1th frame data F(n+1).

In operation S322, the frame data change detector 110 may detect the n+1th change V(n+1) between the n+1th frame data F(n+1) and the nth frame data F(n) that is previous frame data. For example, it is assumed that the n+1th change V(n+1) is less than the first threshold. The ensemble section controller 120 may incorporate the n+1th frame data F(n+1) into the ensemble section of the nth frame data F(n).

In operation S323, the n+1th frame data F(n+1) may be transferred to the second neural network classifier 132. The second neural network classifier 132 may identify the first class $C1(n+1)$ and the second class $C2(n+1)$ from the n+1th frame data F(n+1). The first class $C1(n+1)$ and the second class $C2(n+1)$ are transferred to the recognition result classifier 140.

In operation S324, the recognition result classifier 140 may output an average of the first classes $C1(n)$ and $C1(n+1)$, for example, an average of probabilities as a first ensemble class $EC1(n+1)$. Also, the recognition result classifier 140 may output an average of the second classes $C2(n)$ and $C2(n+1)$, for example, the average of the probabilities as a second ensemble class $EC2(n+1)$.

Figure 6:
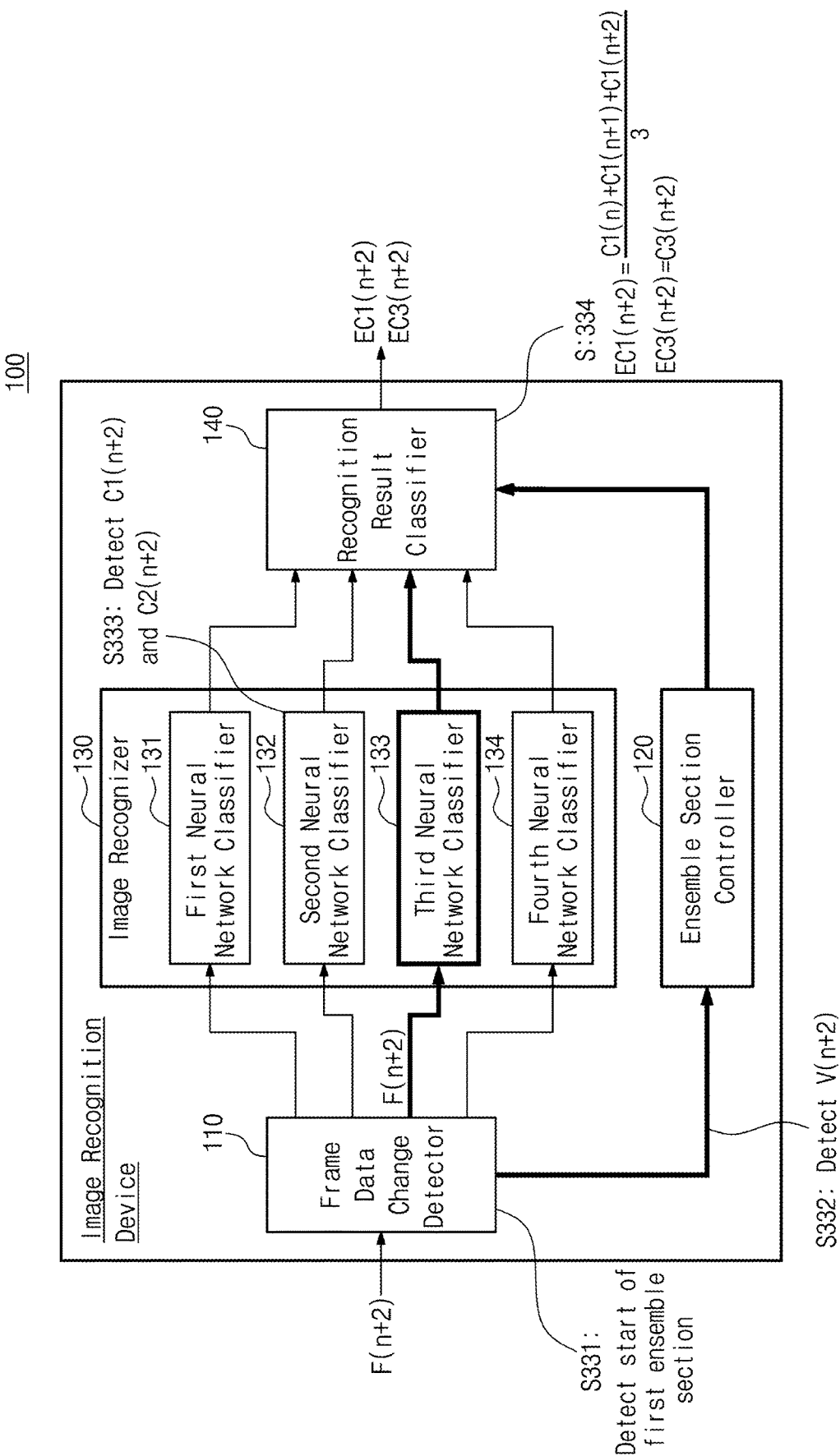
FIG. 6 is a diagram illustrating how an image recognition device recognizes an image from n+2th frame data.

FIG. 6 is a diagram illustrating how the image recognition device 100 recognizes an image from the n+2th frame data F(n+2). Referring to FIG. 6, in operation S331, the frame data change detector 110 may receive the n+2th frame data F(n+2).

In operation S332, the frame data change detector 110 may detect the n+2th change V(n+2) between the n+2th frame data F(n+2) and the n+1th frame data F(n+1) that is previous frame data. For example, it is assumed that the n+2th change V(n+2) is less than the first threshold. The ensemble section controller 120 may incorporate the n+2th frame data F(n+2) into the ensemble section of the n+1th frame data F(n+1).

In operation S333, the n+2th frame data F(n+2) may be transferred to the third neural network classifier 133. The third neural network classifier 133 may identify a first class $C1(n+2)$ and a third class $C3(n+2)$ from the n+2th frame data F(n+2). The first class $C1(n+2)$ and the third class $C3(n+2)$ are transferred to the recognition result classifier 140.

In operation S334, the recognition result classifier 140 may output an average of the first classes $C1(n)$, $C1(n+1)$, and $C1(n+2)$, for example, the average of the probabilities as a first ensemble class $EC1(n+2)$. Also, the recognition result classifier 140 may output the third class $C3(n+2)$ as a third ensemble class EC3 (n+2).

Figure 7:
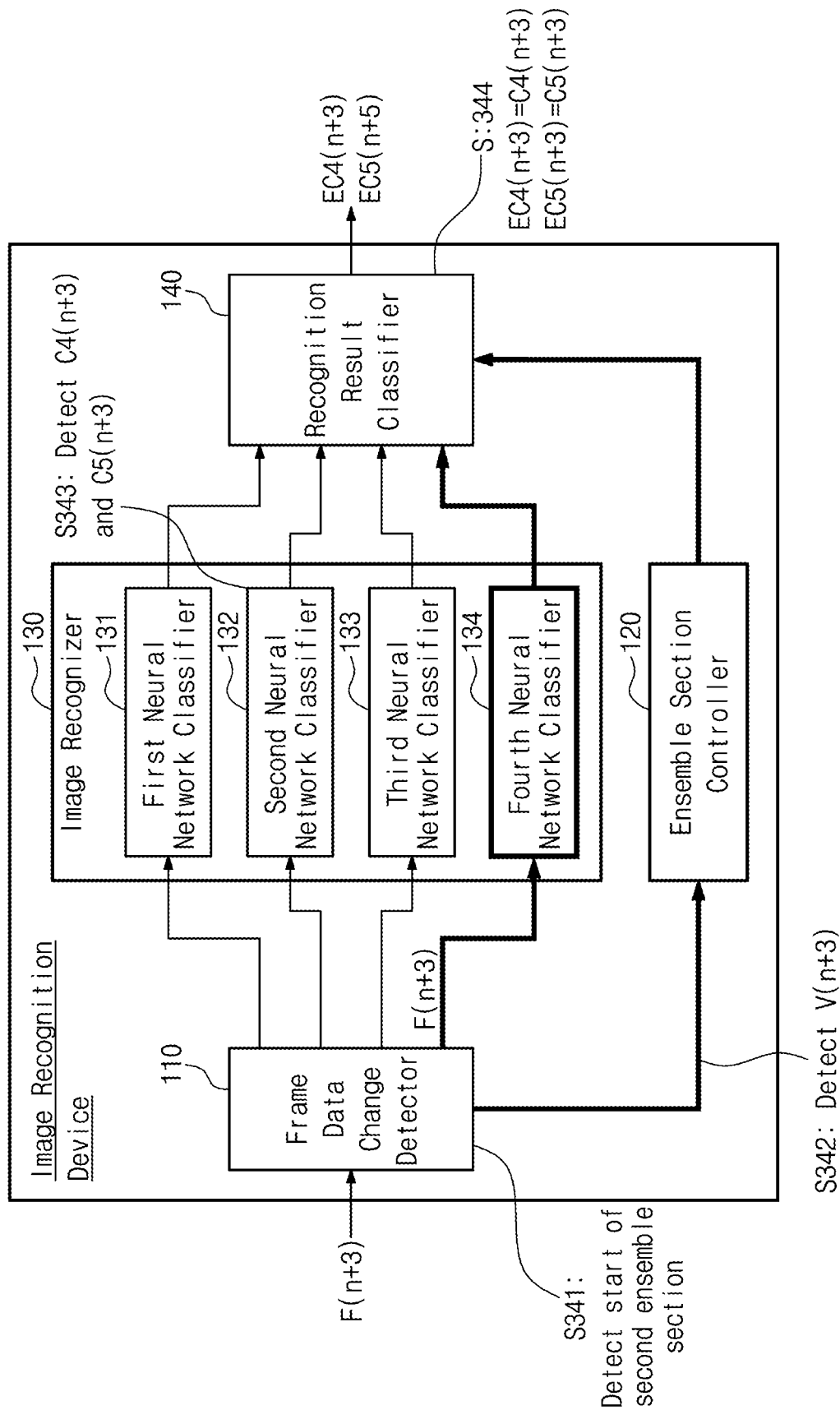
FIG. 7 is a diagram illustrating how an image recognition device recognizes an image from n+3th frame data.

FIG. 7 is a diagram illustrating how an image recognition device 100 recognizes an image from the n+3th frame data F(n+3). Referring to FIG. 7, in operation S341, the frame data change detector 110 may receive the n+3th frame data F(n+3).

In operation S342, the frame data change detector 110 may detect the n+3th change V(n+3) between the n+3th frame data F(n+3) and the n+2th frame data F(n+2) that is previous frame data. For example, it is assumed that the n+3th change V(n+3) is equal to or greater than the first threshold. The ensemble section controller 120 may set the n+3th frame data F(n+3) as the start of a new ensemble section, and may set the n+2th frame data F(n+2) as the end of the ensemble section.

In operation S343, the n+3th frame data F(n+3) may be transferred to the fourth neural network classifier 134. The fourth neural network classifier 134 may identify a fourth class C4(n+3) and a fifth class C5(n+3) from the n+3th frame data F(n+3). The fourth class C4(n+3) and the fifth class C5(n+3) are transferred to the recognition result classifier 140.

In operation S344, the recognition result classifier 140 may output the fourth class C4(n+3) as a fourth ensemble class EC4(n+3). In addition, the recognition result classifier 140 may output the fifth class C5(n+3) as a fifth ensemble class EC5(n+3).

Subsequently, when the n+4th frame data is received, the n+4th frame data may be processed again by the first neural network classifier 131. Subsequently, the second to fourth neural network classifiers 132 to 134 may be sequentially activated for n+5th to n+7th frame data.

Figure 8:
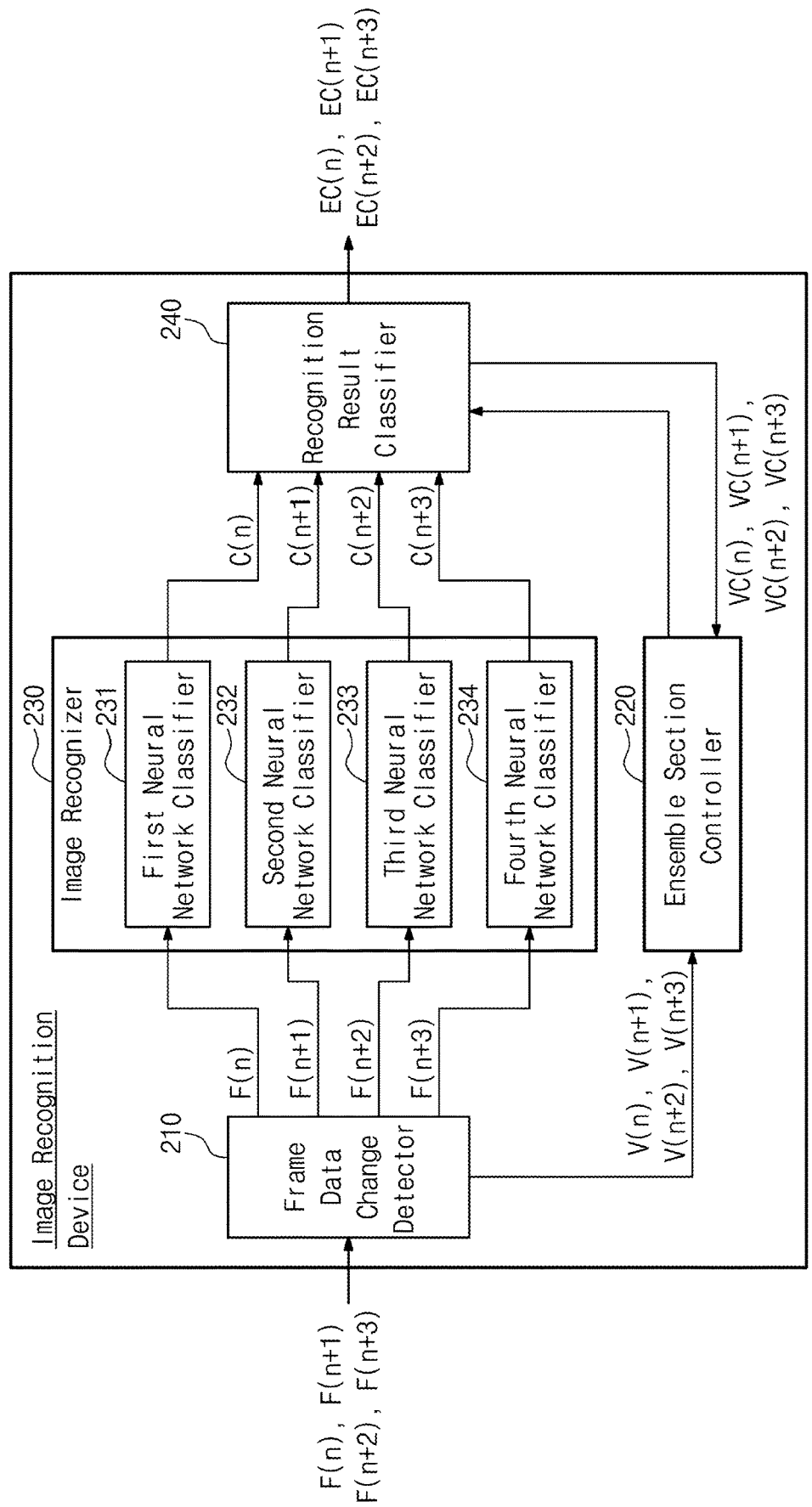
FIG. 8 is a diagram illustrating an image recognition device according to another embodiment of the inventive concept.

FIG. 8 is a diagram illustrating an image recognition device 200 according to another embodiment of the inventive concept. Referring to FIG. 8, the image recognition device 200 includes a frame data change detector 210, an ensemble section controller 220, an image recognizer 230, and a recognition result classifier 240. The image recognizer 230 may include first to fourth neural network classifiers 231 to 234.

The frame data change detector 210, the ensemble section controller 220, the image recognizer 230, and the recognition result classifier 240 may operate in the same manner as the frame data change detector 110, the ensemble section controller 120, the image recognizer 130, and the recognition result classifier 140, which are described with reference to FIG. 1.

In addition to a function of the recognition result classifier 140 of FIG. 1, the recognition result classifier 240 may detect a difference VC(n), VC(n+1), VC(n+2), or VC(n+3) between classes C(n), C(n+1), C(n+2), or C(n+3) identified from currently received frame data F(n), F(n+1), F(n+2), or F(n+3) and classes identified from previous frame data The recognition result classifier 240 may transfer the detected difference VC(n), VC(n+1), VC(n+2), or VC(n+3) to the ensemble section controller 220. The ensemble section controller 220 may correct an ensemble section that is set based on a change V(n), V(n+1), V(n+2) or V(n+3) by using the difference VC(n), VC(n+1), VC(n+2), or VC(n+3).

Figure 9:
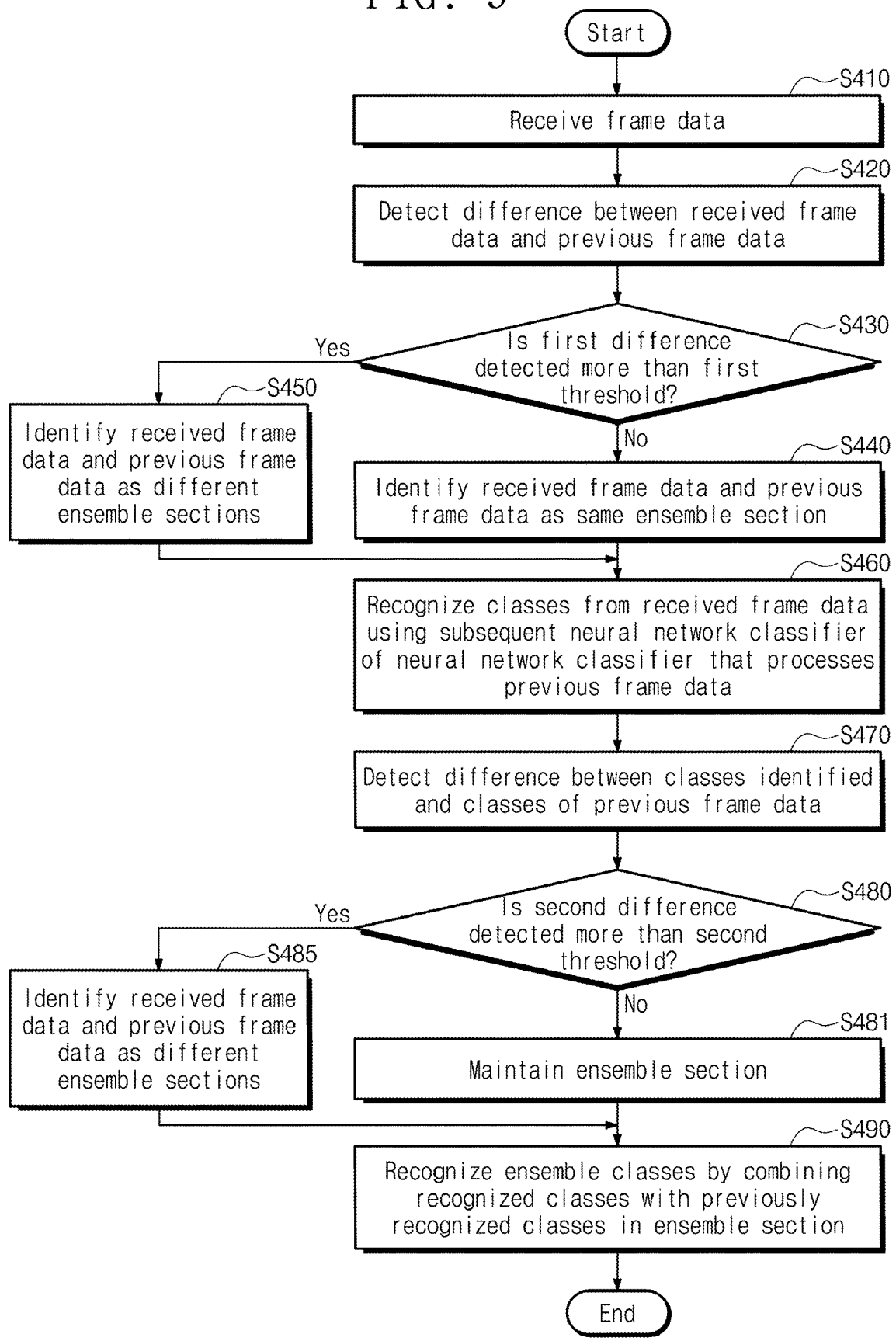
FIG. 9 is a flowchart describing an operating method of an image recognition device of FIG. 8.

FIG. 9 is a flowchart describing an operating method of the image recognition device 200 of FIG. 8. Referring to FIGS. 8 and 9, operations S410 to S460 are performed in the same manner as operations S210 to S260 in FIG. 3. Therefore, additional descriptions thereof will be omitted to avoid redundancy.

In operation S470, the recognition result classifier 240 may detect a difference VC(n), VC(n+1), VC(n+2), or VC(n+3) (or change) between classes C(n), C(n+1), C(n+2), or C(n+3) identified from the currently received frame data F(n), F(n+1), F(n+2), or F(n+3) and classes identified from previous frame data.

For example, the difference VC(n), VC(n+1), VC(n+2), or VC(n+3) may include a difference in type or number of the identified classes C(n), C(n+1), C(n+2), or C(n+3), or a difference in probability of each of the identified classes C(n), C(n+1), C(n+2), or C(n+3).

In operation S480, the ensemble section controller 220 may determine whether the detected difference VC(n), VC(n+1), VC(n+2), or VC(n+3) is greater than or equal to a second threshold. When the detected difference VC(n), VC(n+1), VC(n+2), or VC(n+3) is less than the second threshold, in operation S481, the ensemble section controller 220 may maintain an existing ensemble section set based on the change V(n), V(n+1), V(n+2) or V(n+3). Thereafter, operation S490 may be performed. Operation S490 may be performed in the same manner as operation S270.

When the detected difference VC(n), VC(n+1), VC(n+2) or VC(n+3) is more than the second threshold, in operation S485, the ensemble section controller 220 may identify the currently received frame data F(n), F(n+1), F(n+2), or F(n+3) and the previous frame data as different ensemble sections.

For example, even when two consecutive frame data are set to belong to the same ensemble section, based on the change V(n), V(n+1), V(n+2), or V(n+3), the two frame data may be incorporated into different ensemble sections. Among the two frame data, preceding frame data may be set to the end of the existing ensemble section, and the subsequent frame data may be set to the start of the new ensemble section. Thereafter, operation S490 is performed. Operation S490 may be performed in the same manner as operation S270.

Figure 10:
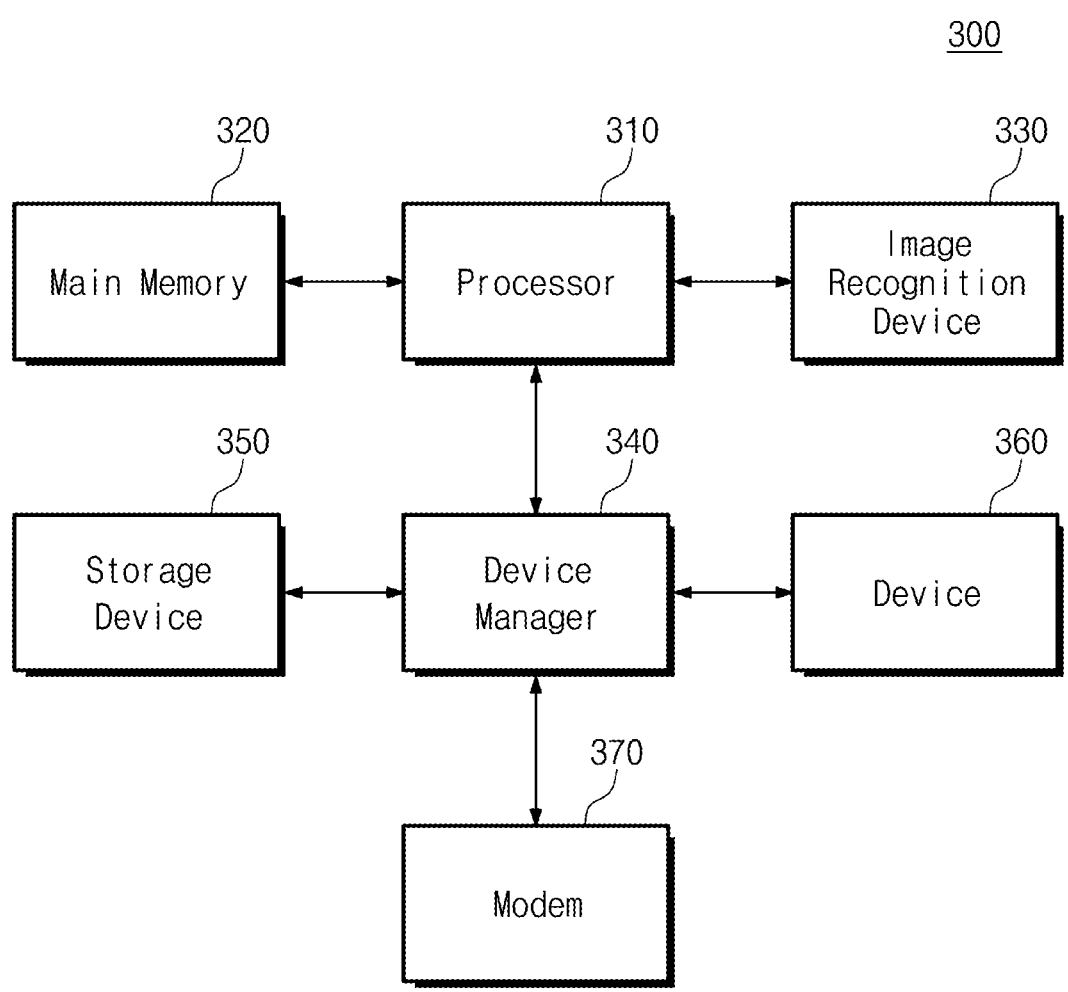
FIG. 10 is a block diagram illustrating a computing device according to an embodiment of the inventive concept.

FIG. 10 is a block diagram illustrating a computing device 300 according to an embodiment of the inventive concept. Referring to FIG. 10, the computing device 300 includes a processor 310, a main memory 320, an image recognition device 330, a device manager 340, a storage device 350, a camera 360, and a modem 370.

The processor 310 may execute an operating system operating the computing device 300 and various commands and codes. The processor 310 may include an application processor (AP) or a central processing unit (CPU).

The main memory 320 may be an operating memory of the processor 310. The main memory 320 may include a dynamic random access memory (DRAM) or a storage class memory (SCM).

The image recognition device 330 may include the image recognition device 100 or 200 according to an embodiment of the inventive concept. The image recognition device 330 may be an auxiliary processor configured to perform the operations, methods, or processes described with reference to FIGS. 1 to 9. For example, the image recognition device 330 may be a graphic processing unit (GPU) or a neural network processing unit (NPU).

The device manager 340 may connect the processor 310 and peripheral devices of the computing device 300 to one another. For example, the device manager 340 may connect the storage device 350, the camera 360, and the modem 370 to the processor 310.

The storage device 350 may be an auxiliary storage device of the computing device 300. The storage device 350 may include a hard disk drive (HDD), a solid state drive (SSD), an optical disk drive (ODD), or a removable memory card such as a USB memory.

The camera 360 may be configured to capture external scenes and to generate a plurality of frame data. The modem 370 may be configured to communicate with the external device. For example, the modem 370 may communicate the plurality of frame data with the external device. The plurality of frame data that are obtained by the camera 360 or the modem 370 may be stored in the main memory 320.

The processor 310 may request the image recognition device 330 to perform image recognition with respect to the plurality of frame data stored in the main memory 320. The processor 310 may receive a result of image recognition from the image recognition device 330, for example, ensemble classes. The processor 310 may perform subsequent processing using the ensemble classes. The plurality of frame data loaded in the main memory 320 may be stored in the storage device 350.

As described above, components of the image recognition device 100 or 200 are described using terms such as first, second, third, etc. However, terms such as first, second, and third are used to distinguish components from one another, and do not limit the inventive concept. For example, terms such as first, second, third, etc. do not imply numerical meaning in any order or in any form.

In the above-described embodiments, components according to embodiments of the inventive concept are illustrated using blocks. The blocks may be implemented as various hardware devices such as an Integrated Circuit (IC), an Application Specific IC (ASIC), a Field Programmable Gate Array (FPGA), and a Complex Programmable Logic Device (CPLD), a firmware running on hardware devices, software such as an application, or a combination of hardware devices and software. Further, the blocks may include circuits composed of semiconductor elements in the IC or circuits registered as IP (Intellectual Property).

According to an embodiment of the inventive concept, an image recognition device identifies classes by applying different neural network classifiers to a plurality of frame data sequentially received, and combines the identified classes to combine classification results of the different neural network classifiers. The different neural network classifiers are activated alternately, and perform an operation using a common resource. Accordingly, the image recognition device capable of increasing an accuracy of image recognition, while reducing or maintaining a resource required for the image recognition, a method of operating the image recognition device, and a computing device including the image recognition device are provided.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. An image recognition device comprising:
 a frame data change detector configured to sequentially receive a plurality of frame data and to detect a difference between two consecutive frame data;
 an ensemble section controller configured to set an ensemble section in the plurality of frame data, based on the detected difference, the ensemble section including a multiplicity of frame data that are determined from the plurality of frame data based on the detected difference;
 an image recognizer including a plurality of neural network classifiers that are learned in different ways and configured to sequentially identify classes respectively corresponding to the multiplicity of frame data by applying the multiplicity of frame data to different neural network classifiers among the plurality of neural network classifiers; and
 a recognition result classifier configured to sequentially identify ensemble classes respectively corresponding to the multiplicity of frame data by combining the classes of the multiplicity of frame data in the ensemble section.

2. The image recognition device of claim 1, wherein, when the difference between the two consecutive frame data is greater than a threshold, the two consecutive frame data are incorporated into different ensemble sections by the ensemble section controller.

3. The image recognition device of claim 2, wherein the ensemble section controller sets preceding frame data of the two consecutive frame data as last frame data of a current ensemble section and sets subsequent frame data of the two consecutive frame data as start frame data of a subsequent ensemble section.

4. The image recognition device of claim 1, wherein, when the difference between the two consecutive frame data is less than a threshold, the ensemble section controller includes the two consecutive frame data in a current ensemble section.

5. The image recognition device of claim 1, wherein the image recognizer includes neural network classifiers learned in different ways and sequentially applies the neural network classifiers to the multiplicity of frame data in the ensemble section.

6. The image recognition device of claim 5, wherein the neural network classifiers share operation resources of the image recognizer and are activated alternately.

7. The image recognition device of claim 5, wherein the recognition result classifier alternately receives the classes from the neural network classifiers.

8. The image recognition device of claim 1, wherein, when a specific class is repeatedly detected from first frame data to nth frame data (where n is a positive integer greater than 1) among the multiplicity of frame data, the recognition result classifier sums probabilities of the specific class detected from the first frame data to the nth frame data, divides the summed result by n, and includes the divided result in an ensemble class of the nth frame data.

9. The image recognition device of claim 1, wherein, when a specific class is detected from nth frame data (where n is a positive integer greater than 2) among the multiplicity of frame data, and when the specific class is detected k times (where k is a positive integer greater than 1 and less than n) from first frame data to the nth frame data, the recognition result classifier sums probabilities of the specific class detected from the first frame data to the nth frame data, divides the summed result by k, and includes the divided result in an ensemble class of the nth frame data.

10. The image recognition device of claim 1, wherein, when a specific class is detected from nth frame data (where n is a positive integer greater than 1) among the multiplicity of frame data, and when the specific class is first detected from first frame data to the nth frame data, the recognition result classifier includes the specific class in an ensemble class of the nth frame data.

11. The image recognition device of claim 1, wherein, when a specific class is detected from first frame data among the multiplicity of frame data, the recognition result classifier includes the specific class in an ensemble class of the first frame data.

12. The image recognition device of claim 1, wherein the ensemble section controller is configured to further receive the classes, and the ensemble section controller corrects the ensemble section, based on the received classes.

13. The image recognition device of claim 12, wherein, when a difference between the classes corresponding to a plurality of consecutive frame data in the ensemble section is greater than a threshold, the ensemble section controller incorporates the plurality of consecutive frame data into different ensemble sections.

14. A method of operating an image recognition device, the method comprising:
- sequentially receiving a plurality of frame data;
- setting an ensemble section, based on a difference between previous frame data and received frame data among the plurality of frame data, the ensemble section including a multiplicity of frame data that are determined from the plurality of frame data based on the difference;
- identifying a class in the received frame data by using a first neural network classifier different from a second neural network classifier applied to the previous frame data in the ensemble section, the first neural network classifier and the second neural network classifier learned in different ways; and
- identifying an ensemble class by combining a preceding class identified in the previous frame data in the ensemble section and the class identified in the received frame data.

15. The method of claim 14, wherein the identifying of the ensemble class includes:
- combining preceding classes identified in all of a plurality of previous frame data in the ensemble section and the class identified in the received frame data.

16. The method of claim 14, wherein the setting of the ensemble section includes:
- when the difference between the previous frame data and the received frame data is less than a threshold, incorporating the received frame data into the ensemble section.

17. The method of claim 14, further comprising:
- correcting the ensemble section by using the class identified in the received frame data.

18. A computing device comprising:
- a processor;
- a memory configured to store a plurality of frame data; and
- an image recognition device including a plurality of neural network classifiers that are learned in different ways and configured to perform an image recognition of the plurality of frame data stored in the memory, in response to a request of the processor, and
- wherein the image recognition device is configured to:
- set an ensemble section, based on differences of the plurality of frame data, the ensemble section including a multiplicity of frame data that are determined from the plurality of frame data based on the differences;
- identify classes of the multiplicity of frame data by applying different neural network classifiers to the multiplicity of frame data, and
- identify an ensemble class of a specific time by combining a class of current frame data of the specific time and classes of a plurality of previous frame data in the ensemble section.

19. The computing device of claim 18, wherein the image recognition device compares the class of the current frame data and the classes of the plurality of previous frame data in the ensemble section and corrects the ensemble section depending on the comparison result.

20. The computing device of claim 18, wherein, when the number of frame data included in the ensemble section reaches a threshold, the image recognition device ends the ensemble section and starts a new ensemble section from a subsequent frame data.

* * * * *